(12) United States Patent
Bellew

(10) Patent No.: US 10,202,070 B1
(45) Date of Patent: Feb. 12, 2019

(54) VEHICLE BACKUP FLASHING DEVICE

(71) Applicant: Louis Bellew, San Diego, CA (US)

(72) Inventor: Louis Bellew, San Diego, CA (US)

( * ) Notice: Subject to any disclaimer, the term of this patent is extended or adjusted under 35 U.S.C. 154(b) by 0 days.

(21) Appl. No.: 15/819,004

(22) Filed: Nov. 21, 2017

(51) Int. Cl.
 *B60Q 1/44* (2006.01)
 *B60Q 1/30* (2006.01)
 *B60Q 1/46* (2006.01)

(52) U.S. Cl.
 CPC .............. *B60Q 1/30* (2013.01); *B60Q 1/44* (2013.01); *B60Q 1/46* (2013.01)

(58) Field of Classification Search
 None
 See application file for complete search history.

(56) References Cited

U.S. PATENT DOCUMENTS

| | | | |
|---|---|---|---|
| 3,553,644 A | 1/1971 | Elmer | |
| 4,198,674 A | 4/1980 | Ilhage | |
| 4,301,692 A | 11/1981 | Frazee | |
| 4,859,988 A | 8/1989 | Holtvluwer | |
| 5,027,031 A | 6/1991 | Wheelock | |
| 5,212,468 A | 5/1993 | Adell | |
| 5,770,999 A * | 6/1998 | Rhodes | B60Q 1/00 307/10.8 |
| 7,498,686 B2 | 3/2009 | Capenos | |
| 2004/0246741 A1 | 12/2004 | You | |
| 2011/0175717 A1 | 7/2011 | Drong | |

FOREIGN PATENT DOCUMENTS

DE   202012007995 U   9/2012

* cited by examiner

*Primary Examiner* — Douglas W Owens
*Assistant Examiner* — Jianzi Chen

(57) ABSTRACT

The vehicle backup flashing device is electrically connected in to the electrical system of the automobile such that the vehicle backup flashing device will initiate operation when the transmission of the automobile is placed in a setting to allow the automobile to travel in the reverse direction. Upon initiation, the vehicle backup flashing device periodically illuminates and extinguishes the each of the plurality of brakes lights associated with the automobile. The vehicle backup flashing device further generates an audible sound. The vehicle backup flashing device is designed such that the operation of the brakes of the automobile will override the operation of the vehicle backup flashing device in a manner consistent with FMVSS regulation. The vehicle backup flashing device comprises a timing circuit and a diode. The timing circuit and the diode, are electrically interconnected.

10 Claims, 2 Drawing Sheets

VEHICLE BACKUP FLASHING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of transportation including vehicles, more specifically, an adaptation of an optical signaling device that illuminates the rear of the vehicle.

This disclosure is concerned an optical signaling device that is configured for use with an automobile 161. The automobile 161 further comprises an electrical system 162. The electrical system 162 provides DC electrical power that is used for the operation of the lights of the automobile 161. The electrical system 162 further comprises an electrical ground 169. The automobile 161 is a commercially available device that falls within the regulatory jurisdiction of the National Highway Transportation Safety Administration within the United States Department of Transportation. For the purposes of this disclosure, the relevant regulatory standards regarding an optical signaling device for an automobile 161 is found within the Federal Motor Vehicle Safety Standard (49CFR571). The Federal Motor Vehicle Safety Standard is commonly abbreviated as FMVSS. The standards contained within the FMVSS are similar to are similar to Canadian motor vehicle standards. Within the FMVSS, section 108 (49CFR571.108) concerns itself with lights and signaling devices associated with the automobile 161. The FMVSS requires that an automobile 161 be equipped with a plurality of brake lights 163 and a plurality of backup lights 164. Each of the plurality of brake lights 163 is electrically connected to a brake light switch 165. The brake light switch 165 is interlocked with the brake system of the automobile 161 such that the brake light switch 165 closes to illuminate each of the plurality of brake lights 163 when the brake pedal of the automobile 161 is depressed. Each of the plurality of backup lights 164 is electrically connected to a backup light switch 166. The backup light switch 166 is interlocked with the transmission of the automobile 161 such that the backup light switch 166 closes to illuminate each of the plurality of backup lights 164 when the transmission of the automobile 161 is placed in a setting to allow for travel in the reverse direction. The brake light switch 165 if further defined with a brake light lead 167 which electrically connects the brake light switch 165 to the plurality of brake lights 163. The backup light switch 166 further comprises a backup light lead 168 which electrically connects the backup light switch 166 to the plurality of backup lights 164.

SUMMARY OF INVENTION

The vehicle backup flashing device is adapted for use with an automobile. The vehicle backup flashing device is adapted for use with the electrical system of the automobile. The vehicle backup flashing device is electrically connected in to the electrical system of the automobile such that the vehicle backup flashing device will initiate operation when the transmission of the automobile is placed in a setting to allow the automobile to travel in the reverse direction. Upon initiation, the vehicle backup flashing device periodically illuminates and extinguishes the each of the plurality of brakes lights associated with the automobile to indicate that the automobile is travelling in the reverse direction. The vehicle backup flashing device further generates an audible sound to indicate that the automobile is travelling in the reverse direction. The vehicle backup flashing device is designed such that the operation of the brakes of the automobile will override the operation of the vehicle backup flashing device in a manner consistent with FMVSS regulation. The vehicle backup flashing device comprises a timing circuit, and a diode. The timing circuit and the diode are electrically interconnected.

These together with additional objects, features and advantages of the vehicle backup flashing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle backup flashing device in detail, it is to be understood that the vehicle backup flashing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle backup flashing device.

It is therefore important that the claims be regarded as including such equivalent construction insofar as they do not depart from the spirit and scope of the vehicle backup flashing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
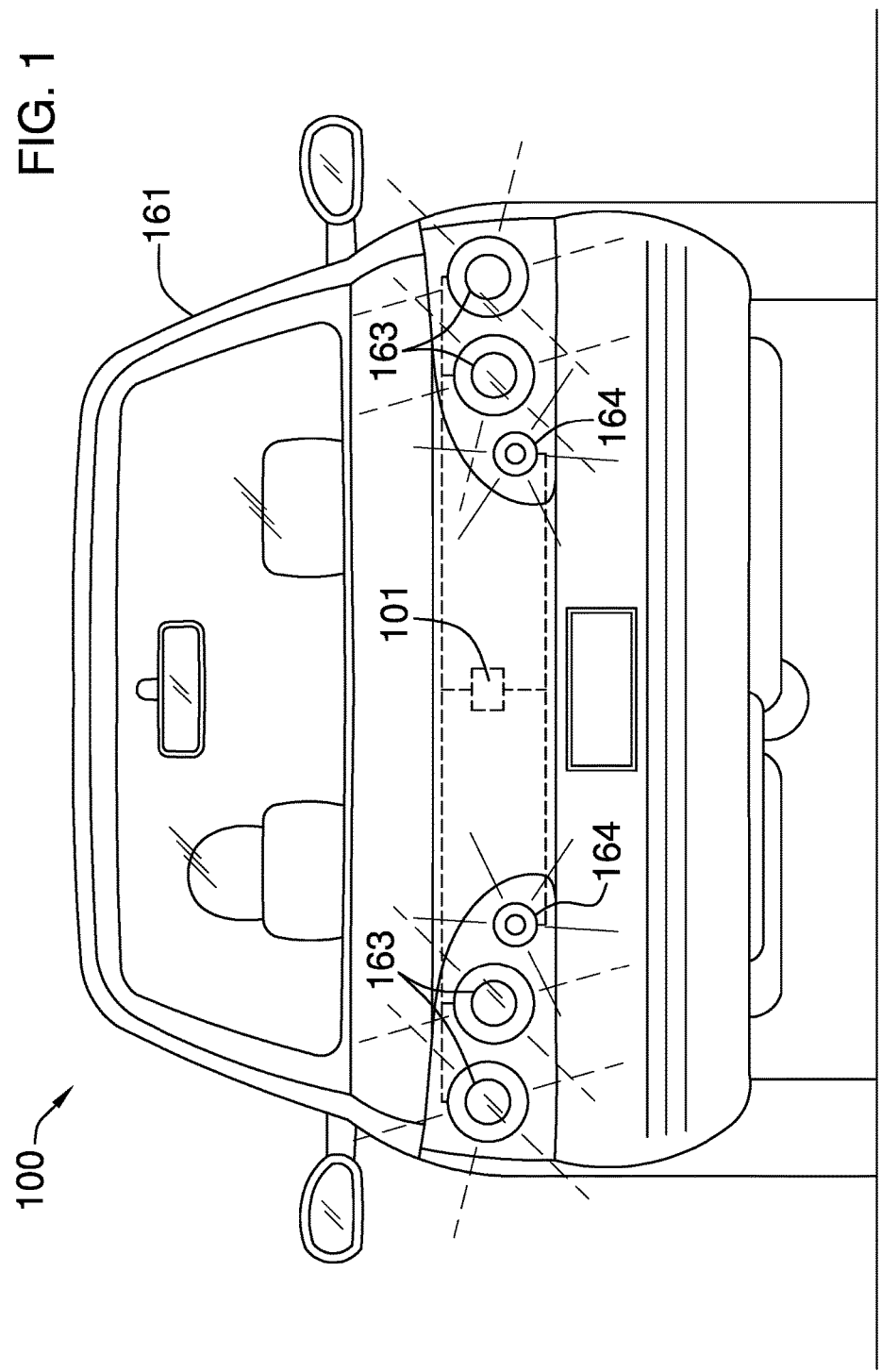
FIG. 1 is a rear view of an embodiment of the disclosure.
Figure 2:
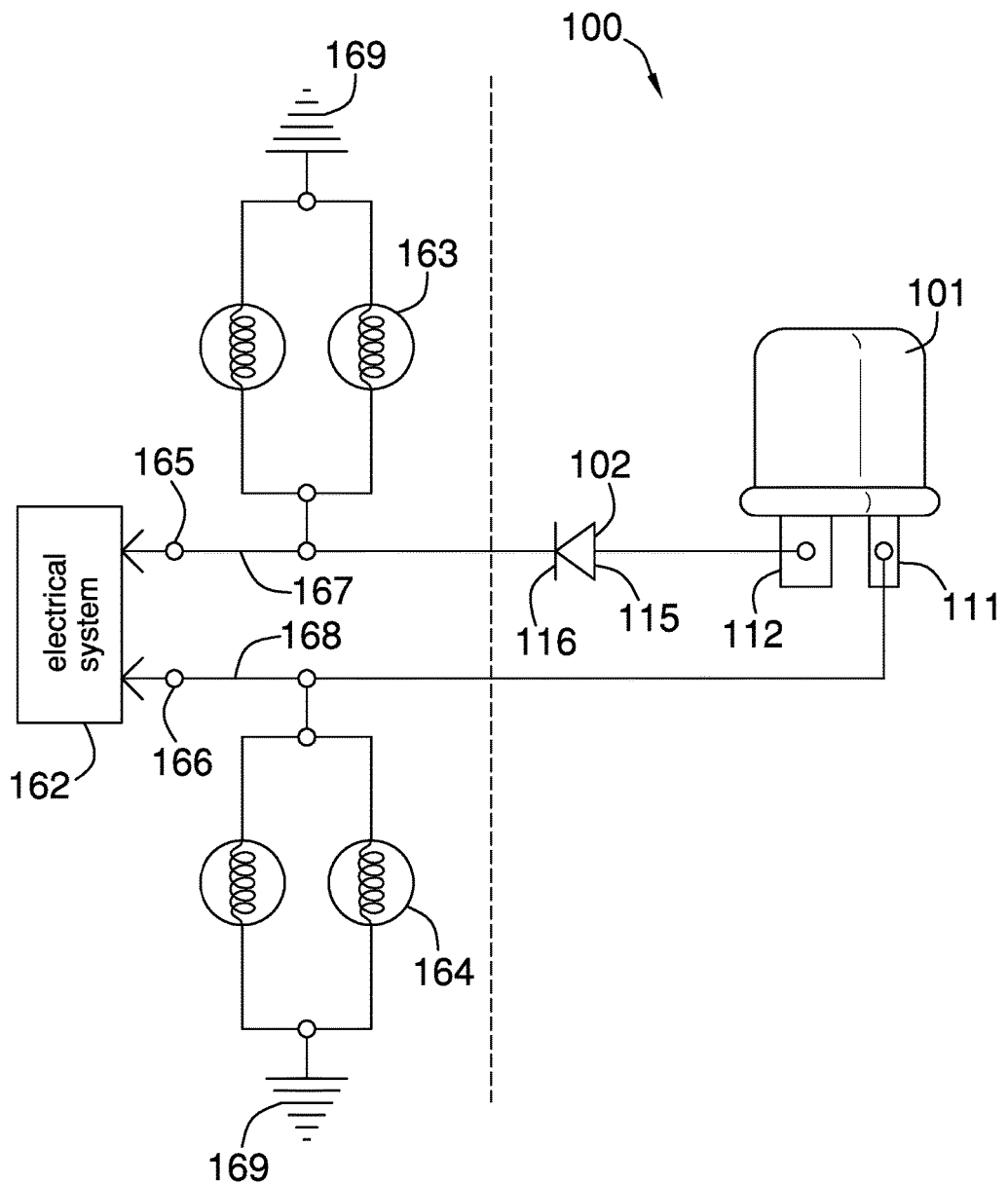
FIG. 2 is a schematic view of an embodiment of the disclosure.

Detailed reference will now be made to one or more potential embodiments of the disclosure, which are illustrated in FIGS. 1 through 2.

The vehicle backup flashing device 100 (hereinafter invention) is adapted for use with an automobile 161. The invention 100 is adapted for use with the electrical system 162 of the automobile 161. The invention 100 is electrically connected in to the electrical system 162 of the automobile 161 such that the invention 100 will initiate operation when the transmission of the automobile 161 is placed in a setting to allow the automobile 161 to travel in the reverse direction. Upon initiation, the invention 100 periodically illuminates and extinguishes each of the plurality of brake lights 163 associated with the automobile 161 to indicate that the automobile 161 is travelling in the reverse direction. The invention 100 further generates an audible sound to indicate that the automobile 161 is travelling in the reverse direction. The invention 100 is designed such that the operation of the brakes of the automobile 161 will override the operation of the invention 100 in a manner consistent with FMVSS regulation.

The invention 100 comprises a timing circuit 101 and a diode 102. The timing circuit 101 and the diode 102 are electrically interconnected. The timing circuit 101 is further defined with a first lead 111 and a second lead 112. The diode 102 is further defined with an anode 115 and a cathode 116. The first lead 111 of the timing circuit 101 draws an electrical voltage from the electrical system 162 of the automobile 161.

The timing circuit 101 is an electrical switching circuit. The timing circuit 101 draws an electrical voltage from the electrical system 162 of the automobile 161 through the backup light lead 168 of the backup light switch 166. When the backup light switch 166 of the electrical system 162 is closed, the operation of the timing circuit 101 is initiated.

When the operation of the timing circuit 101 is initiated, the timing circuit 101 goes through a periodic switching cycle of completing and interrupting an electric circuit between the DC voltage available at the backup light lead 168 of the backup light switch 166 and the plurality of brake lights 163. Each periodic cycle of the timing circuit 101 uses the DC voltage supplying the plurality of backup lights 164 to "flash" the plurality of brake lights 163 to indicate that the automobile 161 is moving in the reverse direction.

In the first potential embodiment of the disclosure, the timing circuit 101 is a commercially available flasher relay also commonly referred to in automobiles 161 as a "solenoid flasher."

The diode 102 is a commercially available electrical device that allows the flow of electrical current in one direction. The diode 102 is placed in series between the brake light lead 167 and the second lead 112 of the timing circuit 101.

The invention 100 is installed in the automobile 161 as described in this paragraph. The first lead 111 of the timing circuit 101 electrically connects to the backup light lead 168 of the backup light switch 166. The second lead 112 of the timing circuit 101 electrically connects to the anode 115 of the diode 102. The cathode 116 of the diode 102 electrically connects to the brake light lead 167 of the brake light switch 165.

The theory of operation of the invention 100 is described in the following 5 paragraphs.

The invention 100 remains inactive until the transmission of the automobile 161 is engaged to enable reverse direction travel. At that point, the backup light switch 166 is closed providing an operating voltage to the backup light lead 168 that illuminated the plurality of backup lights 164.

The first lead 111 of the timing circuit 101 taps into this circuit to draw power directly from the electrical system 162 of the automobile 161 for operation. The timing circuit 101 is a periodic, also commonly referred to as an oscillating, switching circuit that connects the plurality of brake lights 163 to the voltage provided through the backup light lead 168 to illuminate and extinguish the plurality of brake lights 163 with an appearance that is commonly referred to as flashing.

When the brake is applied while the automobile 161 is moving in the reverse direction, the brake light switch 165 will close providing uninterrupted power to the plurality of brake lights 163, which continuously illuminates the plurality of brake lights 163. The diode 102 prevents the flow of electricity from the brake light lead 167 into the timing circuit 101.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Battery: As used in this disclosure, a battery is a container consisting of one or more cells, in which chemical energy is converted into electricity and used as a source of power.

Brake: As used in this disclosure, a brake is a device that is used to slow or stop the motion of a machine or a vehicle.

Buzzer: As used in this disclosure, a buzzer is two lead electrical device that generates an audible sound when voltage is applied to the two leads.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

FMVSS: As used in this disclosure, FMVSS is an abbreviation for Federal Motor Vehicle Safety Standard.

Lead: As used in this disclosure, a lead is a conductor that is physically used to electrically connect an electrical component into a larger circuit assembly.

Light: As used in this disclosure, a light is an electrical device that generates visible light to illuminate objects so they can be seen.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry.

Vehicle: As used in this disclosure, a motorized vehicle is a device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An optical signaling device comprising:
   a timing circuit and a diode;
   wherein the timing circuit and the diode are electrically interconnected;
   wherein the timing circuit is further defined with a first lead and a second lead;
   wherein the diode is further defined with an anode and a cathode;
   wherein an automobile is defined with an electrical system;
   wherein the electrical system is further defined with a plurality of brake lights, a plurality of backup lights, a brake light switch, a backup light switch, a brake light lead, a backup light lead, and an electrical ground;
   wherein the optical signaling device is electrically connected to the electrical system of the automobile such that the optical signaling device will initiate operation when the automobile is enabled for travel in the reverse direction;
   wherein the optical signaling device illuminates each of the plurality of brake lights;
   wherein the optical signaling device extinguishes each of the plurality of brake lights;
   wherein the timing circuit is an electrical switching circuit;
   wherein the first lead of the timing circuit draws an electrical voltage from the electrical system of the automobile;
   wherein the timing circuit draws the electrical voltage from the electrical system of the automobile through the backup light lead of the backup light switch;
   wherein when the backup light switch of the electrical system is closed the operation of the timing circuit is initiated;
   wherein when the operation of the timing circuit is initiated, the timing circuit goes through a periodic switching cycle of completing and interrupting an electric circuit between the DC voltage available at the backup light lead of the backup light switch and the plurality of brake lights.

2. The optical signaling device according to claim 1 wherein when the operation of the timing circuit is initiated, the timing circuit goes through a periodic switching cycle of completing and interrupting an electric circuit between the DC voltage available at the backup light lead of the backup light switch.

3. The optical signaling device according to claim 2
   wherein the diode is an electrical device;
   wherein the diode allows the flow of electrical current in one direction.

4. The optical signaling device according to claim 3
   wherein the first lead of the timing circuit electrically connects to the backup light lead of the backup light switch;
   wherein the second lead of the timing circuit electrically connects to the anode of the diode;
   wherein the cathode of the diode electrically connects to the brake light lead of the brake light switch.

5. The optical signaling device according to claim 4 wherein the timing circuit is a flasher relay.

6. An optical signaling device consisting of:
   a timing circuit and a diode;
   wherein the timing circuit and the diode are electrically interconnected;
   wherein the timing circuit is further defined with a first lead and a second lead;
   wherein the diode is further defined with an anode and a cathode;
   wherein an automobile is defined with an electrical system;
   wherein the electrical system is further defined with a plurality of brake lights, a plurality of backup lights, a brake light switch, a backup light switch, a brake light lead, a backup light lead, and an electrical ground;
   wherein the optical signaling device is electrically connected to the electrical system of the automobile such that the optical signaling device will initiate operation when the automobile is enabled for travel in the reverse direction;
   wherein the optical signaling device illuminates each of the plurality of brake lights;
   wherein the optical signaling device extinguishes each of the plurality of brake lights;
   wherein the timing circuit is an electrical switching circuit;

wherein the first lead of the timing circuit draws an electrical voltage from the electrical system of the automobile;

wherein the timing circuit draws the electrical voltage from the electrical system of the automobile through the backup light lead of the backup light switch;

wherein when the backup light switch of the electrical system is closed the operation of the timing circuit is initiated.

7. The optical signaling device according to claim 6 wherein when the operation of the timing circuit is initiated, the timing circuit goes through a periodic switching cycle of completing and interrupting an electric circuit between the DC voltage available at the backup light lead of the backup light switch and the plurality of brake lights.

8. The optical signaling device according to claim 7 wherein the diode is an electrical device;

wherein the diode allows the flow of electrical current in one direction.

9. The optical signaling device according to claim 8 wherein the first lead of the timing circuit electrically connects to the backup light lead of the backup light switch;

wherein the second lead of the timing circuit electrically connects to the anode of the diode;

wherein the cathode of the diode electrically connects to the brake light lead of the brake light switch;

wherein the diode prevents the flow of electricity from the brake light lead to the timing circuit.

10. The optical signaling device according to claim 9 wherein the timing circuit is a flasher relay.

\* \* \* \* \*